United States Patent
Hudgins et al.

(10) Patent No.: US 7,918,611 B2
(45) Date of Patent: Apr. 5, 2011

(54) RECONFIGURATION AND PROTOCOL ADAPTATION OF OPTOELECTRONIC MODULES AND NETWORK COMPONENTS

(75) Inventors: Clay E. Hudgins, Edgewood, NM (US);
Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 765 days.

(21) Appl. No.: 11/776,494

(22) Filed: Jul. 11, 2007

(65) Prior Publication Data
US 2009/0016685 A1 Jan. 15, 2009

(51) Int. Cl.
*G02B 6/36* (2006.01)
*H04B 10/00* (2006.01)
*H04B 10/08* (2006.01)
*H04B 10/20* (2006.01)

(52) U.S. Cl. ............... 385/92; 398/25; 398/58; 398/117

(58) Field of Classification Search ........................ None
See application file for complete search history.

(56) References Cited

U.S. PATENT DOCUMENTS

| | | | |
|---|---|---|---|
| 6,769,030 B1* | 7/2004 | Bournas | 709/233 |
| 2005/0169585 A1* | 8/2005 | Aronson et al. | 385/89 |
| 2005/0249468 A1* | 11/2005 | Aronson et al. | 385/92 |
| 2006/0171414 A1* | 8/2006 | Katibian et al. | 370/468 |
| 2006/0291785 A1* | 12/2006 | Epitaux et al. | 385/92 |
| 2008/0044141 A1* | 2/2008 | Willis et al. | 385/88 |
| 2008/0172610 A1* | 7/2008 | Blair | 715/700 |
| 2010/0054672 A1* | 3/2010 | Tanaka et al. | 385/88 |

* cited by examiner

*Primary Examiner* — Michelle R Connelly Cushwa

(57) ABSTRACT

An optoelectronic module for converting and coupling an information-containing electrical signal with an optical fiber including a housing having an electrical input for coupling with an external cable or information system device and for transmitting and receiving information-containing electrical signals over such input, and a fiber optic connector adapted for coupling with an external optical fiber for transmitting and receiving an optical signal; an electro-optic subassembly coupled to the information containing electrical signal and converting it to and/or from a modulated optical signal corresponding to the electrical signal; means disposed in the housing for determining the electrical and/or optical protocols or packet formats in use; and a processor for adapting the module to utilize the electrical and optical protocol or packet format.

19 Claims, 7 Drawing Sheets

RECONFIGURATION AND PROTOCOL ADAPTATION OF OPTOELECTRONIC MODULES AND NETWORK COMPONENTS

REFERENCE TO RELATED APPLICATIONS

This application is related to U.S. patent application Ser. No. 11/499,120 filed Aug. 4, 2006, and U.S. patent application Ser. No. 11/620,317 filed Jan. 5, 2007, both assigned to the common assignee.

BACKGROUND OF THE INVENTION

1. Field of the Invention

The invention relates to optical communications devices, such as transmitters, receivers, and transceivers used in high throughput fiber optic communications links in local and wide area networks and storage networks, and in particular to the communications protocol and packet format used by such devices, both for network communications and module management by monitoring and adapting the performance of such devices.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal, and similar implementations employ one fiber for both optical signals, traveling in opposite directions. The electrical signals are transferred in both directions over an electrical connectors that interface with the network unit using a standard electrical data link protocol.

The optical transmitter section of such transceiver modules includes one or more semiconductor lasers and an optical assembly to focus or direct the light from the lasers into an optical fiber, which in turn, is connected to a receptacle or connector on the transceiver to allow an external optical fiber to be connected thereto using a standard connector, such as SC, FC or LC. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode it typically packaged in a hermetically sealed package in order to protect it from harsh environmental conditions. The photodiodes are semiconductor chips that are typically a few hundred microns to a couple of millimeters wide and 100 to 500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPM-SA.org), and the 300-pin module (see www.300pinmsa.org), and the QSFP ("Quad Small Form-factor Pluggable", see www.qsfpmsa.org).

Customers and users of such modules are interested in small or miniaturized transceivers in order to increase the number of interconnections or port density associated with the network unit, such as, for example in rack mounted line cards, switch boxes, cabling patch panels, wiring closets, and computer I/O interfaces.

A variety of different optical and electrical communication protocols are in use, such as SONET, Gigabit Ethernet, 10 Gigabit Ethernet, Fibre Channel, and SDH optical protocols, and electrical interfaces such as Infiniband, XAUI, and XIF. Such variety complicates network management and the selection and specification of modules for individual links or applications.

Prior to the present invention, it has not been possible for a pluggable module to be used interchangeably with different optical and electrical protocols, or to adapt to different link or application requirements.

Another aspect of network management is that the length or nature of the link is sometimes reconfigured to accommodate different hubs or terminal end points, and with such network reconfiguration it is necessary to change the operational parameters or characteristics of the module. Some of these characteristics include laser power, wavelength, chirp, the communications packet, such as control field data, data rate, packet size, error correction methodology, or modulation technique.

Prior to the present invention, it has not been easily possible or practical to reconfigure a module to adjust such parameters.

The identification of individual modules in connection with adjusting such operating characteristics of such modules is an important consideration network management. When network conditions change, users must identify the specific components and reconfigure such components of the system.

Still another aspect of network management is module data analysis, to allow one to analyze the real time performances of an optical module in use, and observe error rates as a function of parametric shifts in performance. The information gained may be used in real time to reconfigure operational parametric shifts to achieve optimum product performance.

In the prior art, identification information, such as transceiver type, capability, serial number, compatibility information is known to be capable of being stored, in a transceiver (see, for example, U.S. Patent Application Publication 2003/0128411). However, prior to the present invention such information has not been readily accessible or easily or automatically utilized for adjusting operational parameters or the electrical or optical communications protocol of such individual modules in installations in the field during real time operation.

SUMMARY OF THE INVENTION

1. Objects of the Invention

It is an object of the present invention to provide an optoelectronic module in a small pluggable standardized form factor with an adaptable protocol communications interface.

It is also another object of the present invention to provide a module for use in an optical fiber transmission system with means for collecting total elapsed operating time, temperature, temperature change, and data transmission error rate, and wirelessly externally communicating such data to an external device with a selectable protocol or packet framing format.

It is still another object of the present invention to provide an optical transceiver with a means for collecting and transmitting environmental and operational data at periodic time intervals to an external network manager using a custom or proprietary communications protocol or packet format.

It is another object of the present invention to provide an optical transceiver for use in an optical transmission system with a communications I/O interface to externally communicate the existence of abnormal operating conditions.

It is also another object of the present invention to provide a module for use in an optical fiber transmission system with means for authenticating the module when plugged into a host unit connected to a network using a proprietary protocol or packet format.

It is still another object of the present invention to provide an optical transceiver with a means for communicating with a network manager when plugged into a host unit for verifying and authorizing use of such module using a proprietary protocol or packet format.

Some implementations or embodiments may achieve fewer than all of the foregoing objects.

2. Features of the Invention

Briefly, and in general terms, the present invention provides an optoelectronic module for coupling an information system device with an optical fiber including: a housing including an electrical connector for coupling with an external electrical cable or information system device and for transmitting information-containing electrical signals over the connector, and a fiber optical connector adapted for coupling with an external optic fiber for transmitting and/or receiving an optical signal; an electro-optic subassembly disposed in the housing coupled to the information system device for converting the electrical signal to or from a modulated optical signal corresponding to the electrical signals at a predetermined wavelength; a circuit for determining the optical communications protocol used by the optical signal; and a communication adaptation circuit disposed in the housing for adapting the subassembly to use the optical communications protocol for subsequent communications.

In another aspect, the present invention provides an reconfigurable optoelectronic module for coupling an information system device with an optical fiber including: a housing including an electrical connector for coupling with an external electrical cable or information system device and for transmitting information-containing electrical signals over the connector, and a fiber optical connector adapted for coupling with an external optic fiber for transmitting an optical signal; an electro-optic subassembly disposed in the housing coupled to the information system device for converting the electrical signal to a modulated optical signal corresponding to the electrical signals at a predetermined wavelength; and a controller disposed in the housing for providing an electrical control signal to the electro-optical subassembly for adjusting the communications transmission characteristics of the modulated optical signal.

Some implementations or embodiments may incorporate or implement fewer of the aspects or features noted in the foregoing summaries.

Additional objects, advantages, and novel features of the present invention will become apparent to those skilled in the art form this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
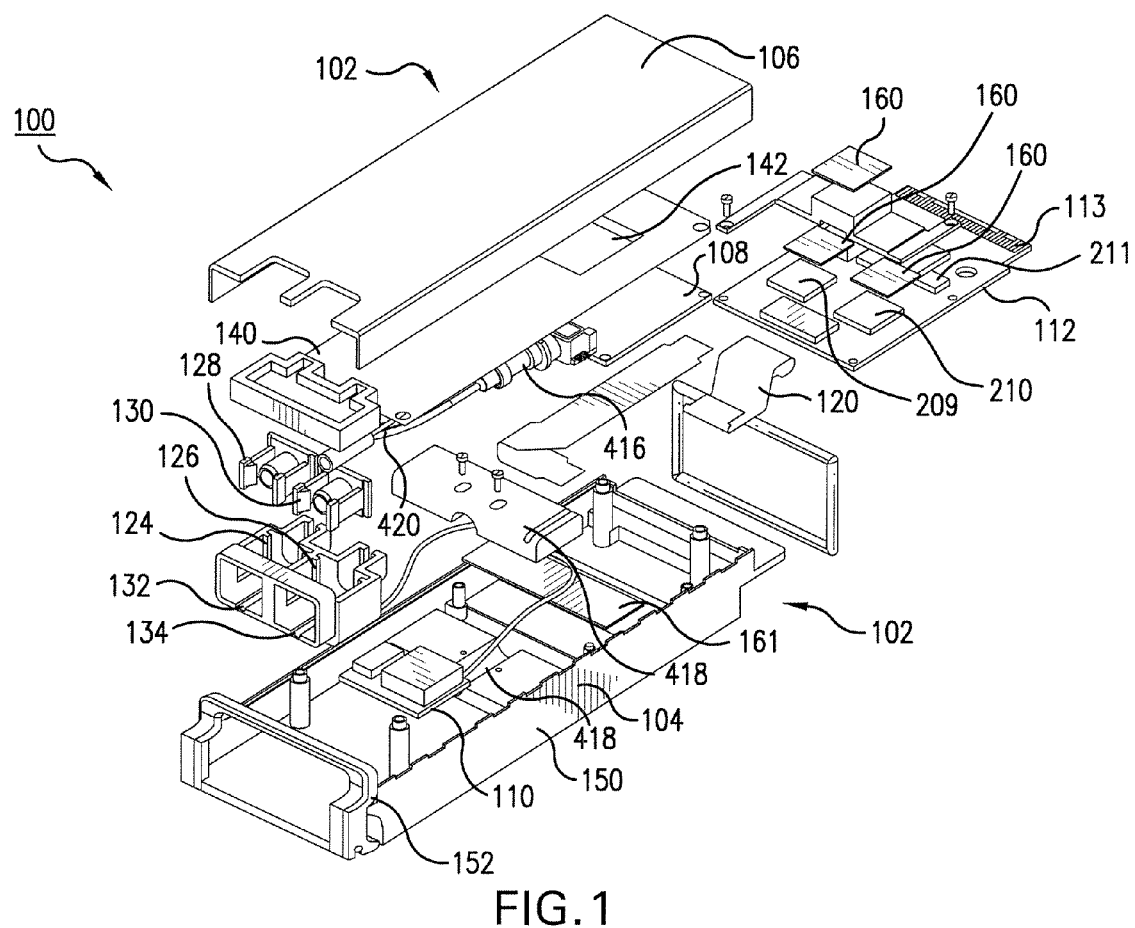
FIG. 1 is an exploded perspective view of an optoelectronic module in accordance with an illustrated embodiment of the invention.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to the identification and parametric environmental and operational data monitoring of pluggable optical communications modules such as transmitters, receivers, and transceivers used in fiber optic communications systems.

Referring now to FIG. 1, there is shown an exploded view of an exemplary pluggable optical transceiver module 100 according to a preferred embodiment of the present invention. In this particular embodiment, the module 100 is compliant with the IEEE 802.3ae 10GBASE-LX4 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having four 3.125 Gbps distributed feedback lasers that enable 300 meter transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers, which may be mounted in a single, hermetically sealed enclosure 415, which interfaces to a fiber coupling subassembly 416. The transmit board 108 is secured in place at the bottom of the housing using a brace 418 attached to the coupling subassembly 416. The brace also functions as a heat sink for dissipating heat from the metallic fiber coupling subassembly 416 and hermetically sealed enclosure 415. In addition, the transmit board 108 and receive board 110 are connected to the PCS/PMA board 112 by respective flex interconnects 121 and 120, or other board-to-board electrical connectors or cables. Thermally conductive gap pads may be provided to transmit the heat generated by the lasers or other components in the transmitter subassembly to the base 104 or cover 106 of the housing, both of which act as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as Flex-Plane™ available from Molex, Inc. of Lisle, Ill., although other flexible substrate may be used as well. The optical fiber 420 originating from the transmitter subassembly is thereby routed to the transmit optical connector plug 130, which is attached to the faceplate 131, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the cover 106 which acts as a heat sink, to contact a heat transmission gap pad 160, so as to provide access and a heat conductive path to the mounted components on the board 112. This area on the board 112 normally would be inaccessible if not for the opening 142. The gap pad 160 is installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment, the transceiver 100 is manufactured in a modular manner using three separate subassemblies mounted in the housing—a transmitter subassembly, a receiver subassembly, and a protocol processing board—with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

Figure 2:
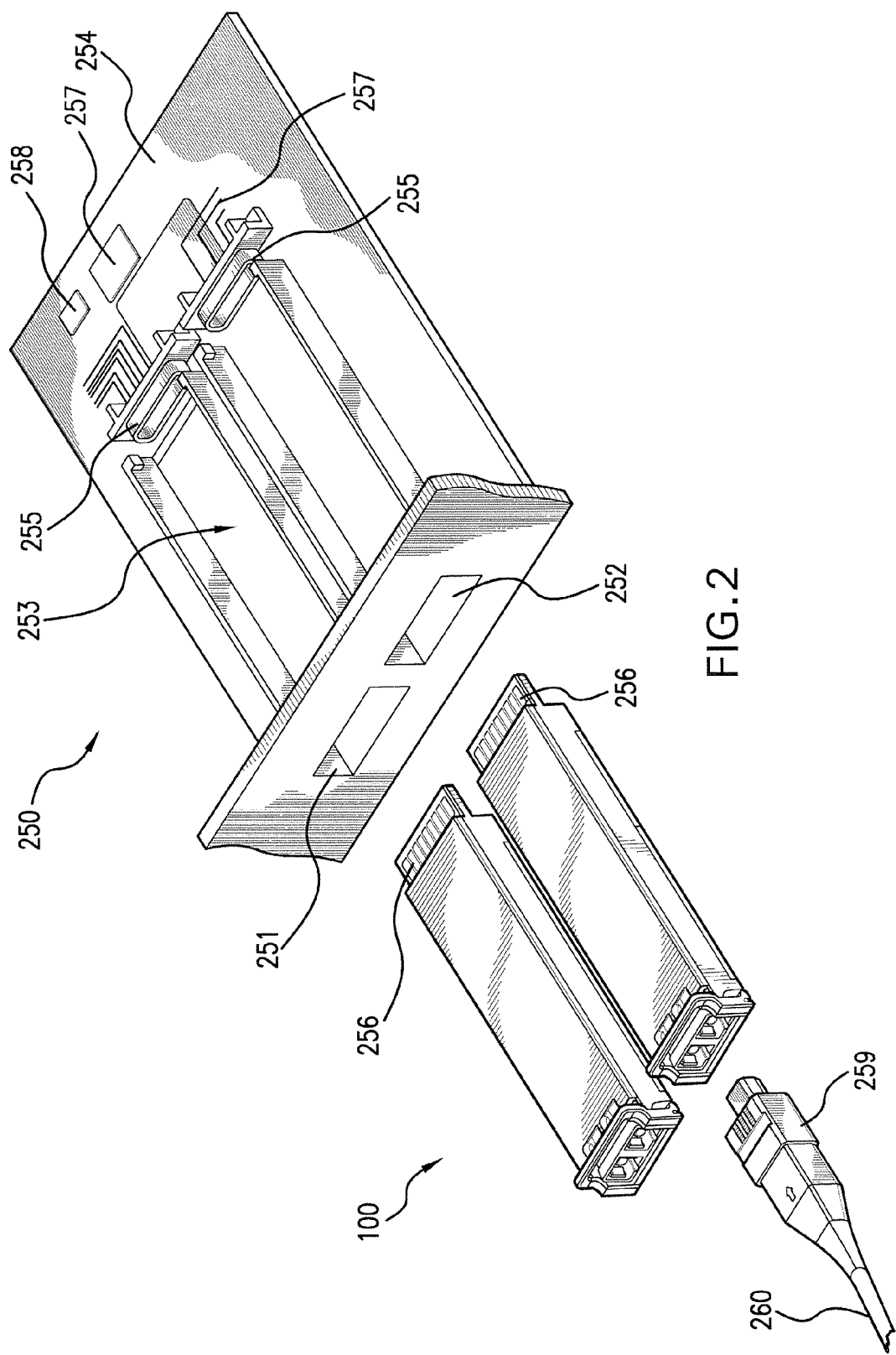
FIG. 2 is a perspective view of a module being inserted into a receptacle or cage in a host unit.

FIG. 2 is a perspective view of a module being inserted into a receptacle or cage in a host unit. The perspective view of the chassis 250 of the host unit or information system device for receiving a pluggable module according to the present invention depicts receptacles 251, 252 adapted for receiving a pluggable module 100, a cage 253 for securing the module adjacent to a printed circuit card 254, and an electrical connector 255 connected to the printed circuit card 254 and adapted for receiving the electrical connector 256 associated with the module. The printed circuit card 254 includes power and bus lines 257, a processor 258, and associated components such as memory 259. An optical cable connector 259 is employed to connect module 100 to the host optical cable plant 260.

Figure 3:
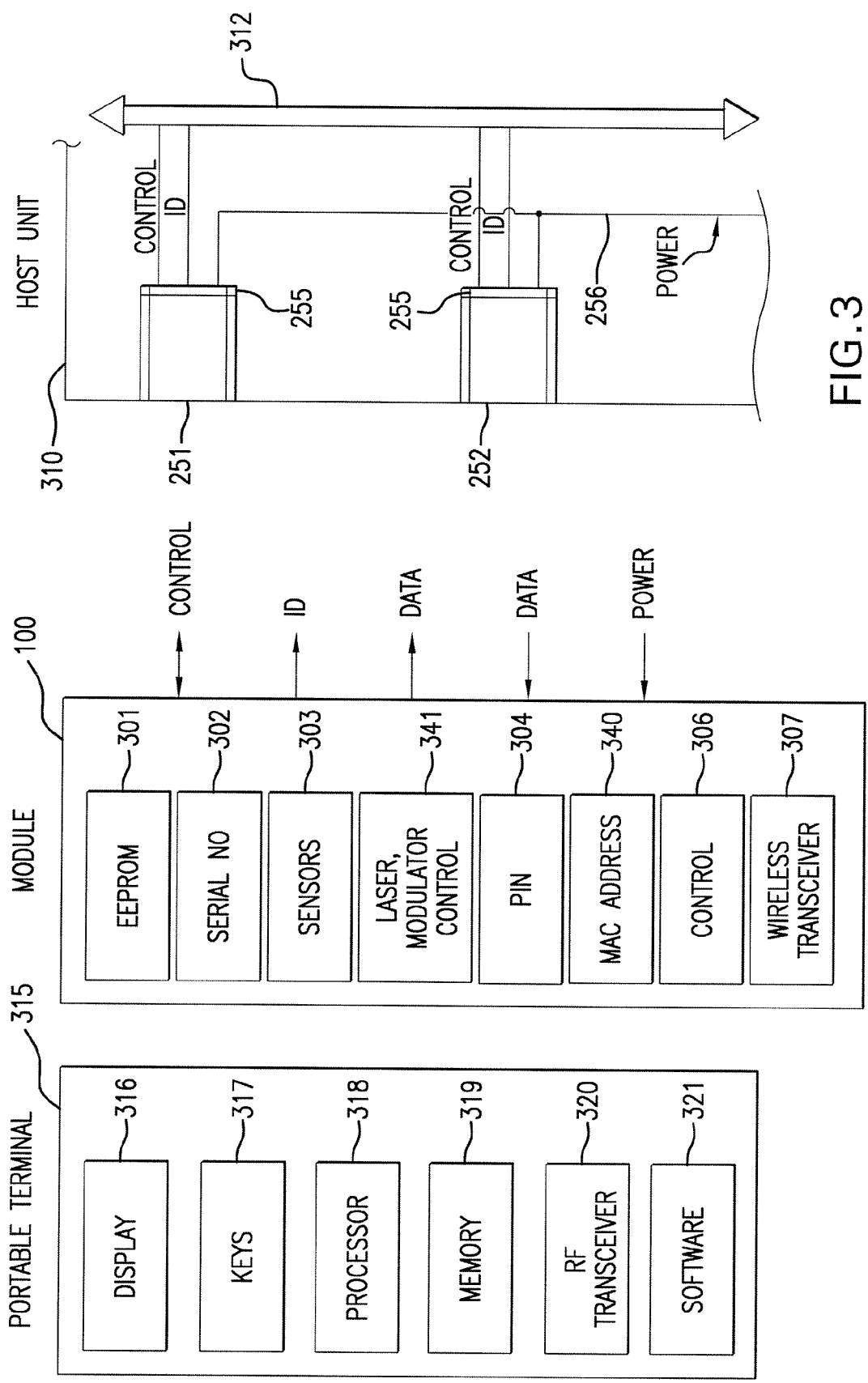
FIG. 3 is a highly simplified block diagram of certain elements of the module, the host unit, and a remote terminal.

FIG. 3 is a highly simplified block diagram of certain elements of the module 100, the host unit 310, and a portable terminal 315. In particular, the module 100 includes an EEPROM 301 for temporarily storing parametric data, a serial number ROM 302 which contains the identity of the manufacturer and the manufacturer's serial number of the module. The sensors 303 acquire the parametric data described in connection with the designation of FIG. 1. A PIN or cryptographic key 304 is also provided, which is utilized to verify the authorization of the module, or its validity, to the host unit prior to the module being capable of operation, or for authorizing operational changes to be made to the module as will subsequently be described.

Various operational control data, such as laser wavelengths, output power, modulator or signal chirp, etc. may be stored in look-up tables, or actively controlled by subassembly 341. Control software 306 is provided to coordinate operation of the various stored or adjustable items and the communications from the host unit 310 or the portable terminal 315. A wireless transceiver or receiver 307 provides means for receiving control instructions via infrared or RF communication from the portable terminal 315, with a MAC address 340 being provided to the module.

A Media Access Control address (MAC address) is a unique identifier associated with a network adapter (NIC), such as a wireless local area network (WLAN) card plugged into a laptop computer. More particularly, it is a Level 2 address in the OSI layer model. The level 2 address is a number that acts like a name for the associated network adapter, and thereby the host computer associated with the adapter.

As the name implies, a MAC address is associated with the media interface which the host unit or module is utilizing for communication. Thus, a MAC address associated with a wireless interface adapter (i.e. a wireless local area network link) could be different than the Ethernet address if the same host were connected over a wired Ethernet link.

Figure 5:
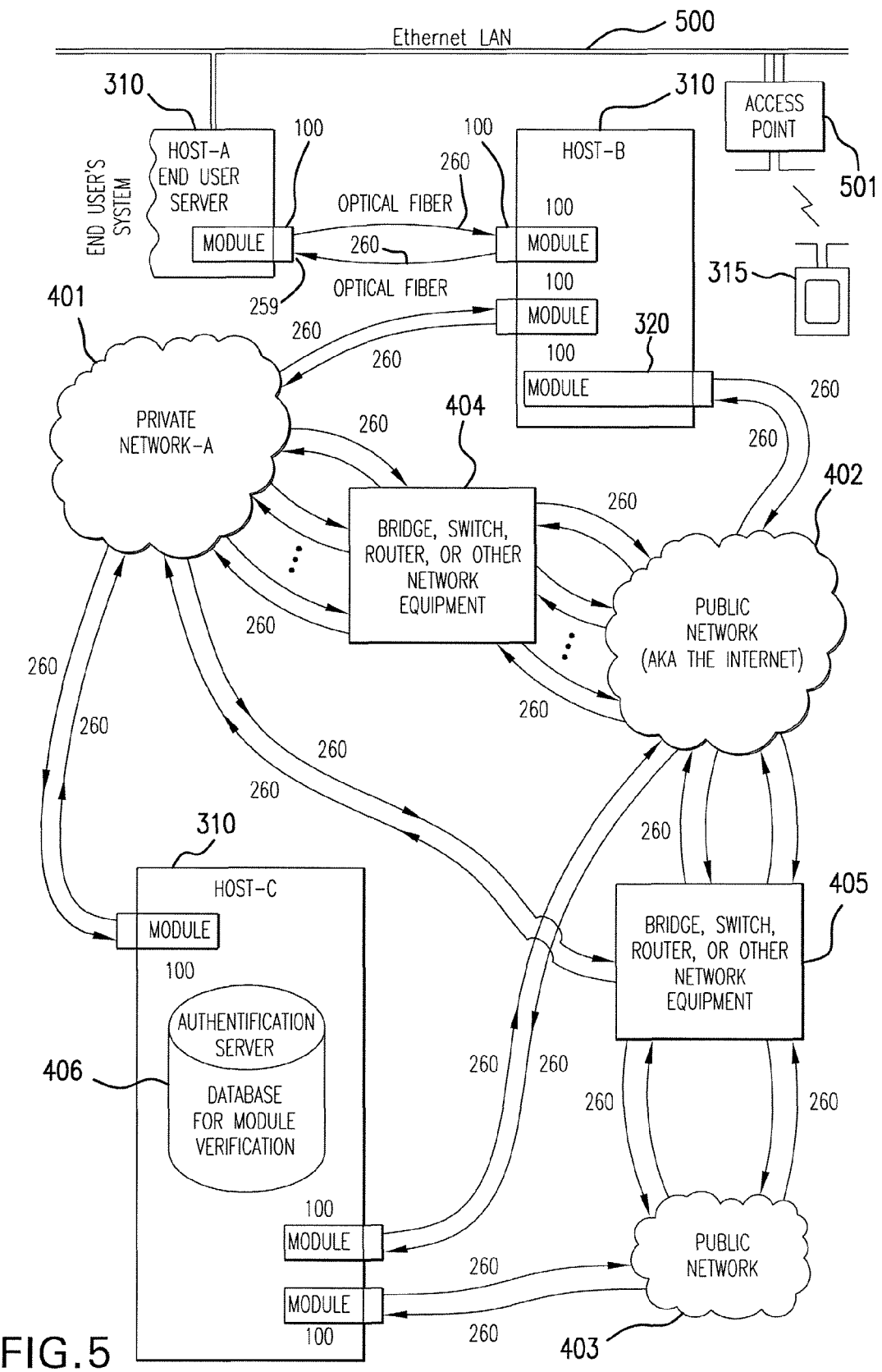
FIG. 5 is a highly simplified diagram of a computer network in which the present invention may be employed.

Short-range wireless communication capability is becoming more widespread in use in a variety of different mobile devices such as portable terminals, cellular phones, personal digital assistants, pagers, MP3 players, and other mobile devices. Such devices may include short-range communication receivers or transceivers, so that the devices have the ability to communicate via RFID, Bluetooth, IEEE 803.11, IEEE 803.15, infrared or other types of short-range communication protocols dependent upon the application and type of receiver or transceiver associated with the mobile device. The portable terminal 315 is preferably equipped with short-range wireless LAN communication transceiver, so as to be capable of accessing both the module 100 and an external network (as depicted in FIG. 5) for further information and services.

The host unit 310 is depicted as including a slot or receptacle 251, 252 for insertion of the module 100 with an electrical connector 255 in the rear of the case 253 for mating with the electrical connector 256 on the module 100. In this representation, there is also depicted a set of control and ID lines from each connector 255 connected to an internal bus 312 in the host unit 310. A power line 256 is also provided in host unit 310 which connects to each connector 255.

The portable terminal 315 may preferably include a display 316, keyboard or data entry buttons 317 (or touch screen display), a processor 318, memory 319, and an infrared or RF transceiver 320. Software 321 is also provided for a variety of operations and applications to be subsequently described.

One key aspect of the present invention is that operational data associated with the module 100 may be transmitted from the module to a technician or a real time computer program referred to as a network manager, either along the wired connection from the host unit 310, or wirelessly by the portable terminal 315, and instructions or control information transmitted from the technician back to the module to change operational parameters or characteristics thereof.

In addition to displaying the operational status and condition of a particular module, the software 321 in the terminal will allow the user to make operational changes in the module, which can be entered in the terminal and such commands then wirelessly communicated to the module. By operational changes we include change of wavelength, change in launch power, change in modulation technique, chirp, error correction technique, payload size, communications protocol, packet control fields, encoding (e.g. 8B/10B, 64b/66b), pseudo random scrambling, etc.

Another aspect of the present invention is that upon being plugged into the host unit 310, the module 100 is able to detect the electrical communications protocol in use by the host unit 310. As noted above, there are a variety of different electrical interfaces or communications protocols in use, including Infiniband, XAUI, XIF, and SFI-5, as well as possibly computer interfaces such as SCSI, USB, and Firewire (IEEE 1304). An adaptable or interchangeable module will detect the electrical signals on the interface, and then by software make a determination of the type of interface in use by the host unit 310. The processor 258 will thereby adjust or adapt the software on the PCS/PMA board 112 to the specific electrical interface.

Still another aspect of the present invention is that upon the optical cable 260 being plugged into the module 100, the module 100 is able to detect the optical communications protocol in use over the fiber. As noted above, there are a variety of different optical communications protocols in use, including SONET, Gigabit Ethernet, 10 Gigabit Ethernet, Fibre Channel and SDH. An adaptable or interchangeable module will detect the optical signals or packet data, perform translation into electrical signals, and analyze the electrical signals by software to make a determination of the type of protocol in use. The processor 258 will thereby adjust or adapt the software on the PCS/PMA board 112 to the specific optical protocol or packet format.

In addition to the components noted above, portable terminals may utilize other data entry media such as magnetic stripe cards, RFID tags, biometric sources, SIM devices, smart cards, electronic key access cards, or the like, as well as a printer for providing a display or print-out of the information transmitted and/or received by the terminal.

Figure 4:
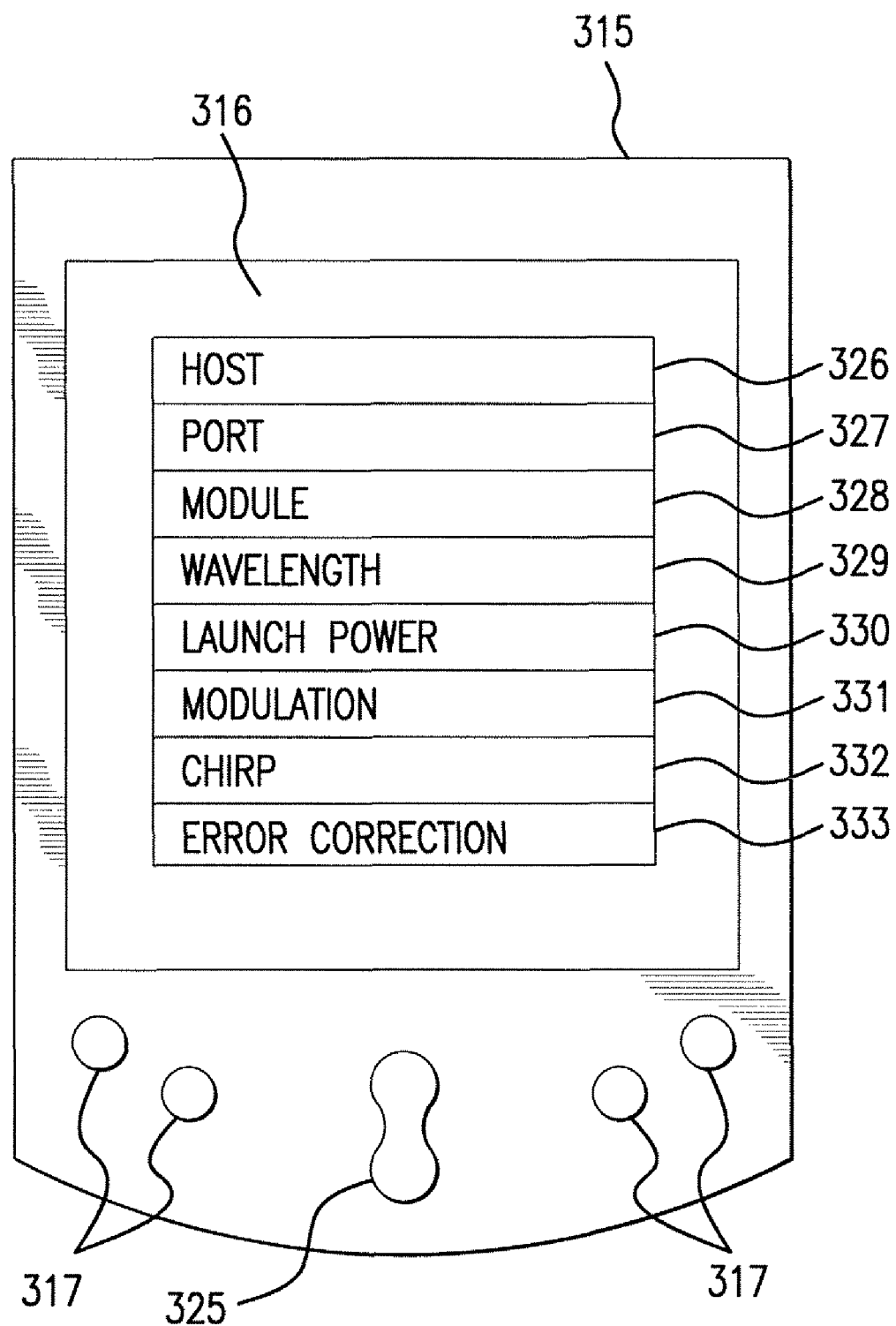
FIG. 4 is a top plan view of a portable terminal used in an embodiment of the present invention.

FIG. 4 is a top plan view of an embodiment of a portable terminal 315 with a display 316 depicting the various parameters and data that may be acquired in real time from the module by wireless transmission and displayed to the user, who may be a maintenance technician in the vicinity of the host units, and checking on the operational status and condition of the modules 100 associated with a host unit.

In particular, FIG. 4 depicts a variety of buttons 317, a scroll button 325, used to adjust the display. An example of the type of data that may be displayed when the portable terminal 315 is in communications range with one or more modules 100 includes identification of the host 326, identification of the port 327, identification of the module (e.g. by serial number or customer identification number) 328, identification of the wavelength in use by the module 329, the launch power 330, the modulation technique 331, the chirp 332, and one or more other operational data fields 333 such as the error correction technique, payload size, etc.

FIG. 5 shows a computer or data communications network as might be employed in multi-site enterprise information systems, and a possible typical configuration or interconnection between a plurality of modules 100 associated with different hosts, several hosts 310 (identified as Host-A, Host-B, and Host-C, a portable or mobile terminal 315, and an authentication server 406. In some instances, the modules 100 may be on the same private network 401 as the authentication server 406. In other cases, the modules 100 may connect directly to the public network 402, such as the Internet. An Ethernet LAN 500 is associated with Host-A 310, including an access point 501.

Similarly, the authentication server may connect to the Internet 402 or one or more private networks 401, 403. When a module 100 and authentication server are on separate private networks, these private networks may be connected directly together by network equipment (bridge, router, or switch) 405.

Alternately, when the module 100 and authentication server 406 are on separate private networks 401, 403, these private networks may first connect to the Internet 402 via network equipment 404, 405 in order to form the necessary end-to-end connectivity between the module 100 and the authentication server 406.

Moreover, a plurality of authentication servers 406 may be distributed around the network for improved fault tolerance and/or improved speed of access. In the case of a plurality of authentication servers 406, these authentication servers will periodically synchronize their databases among themselves.

Figure 6:
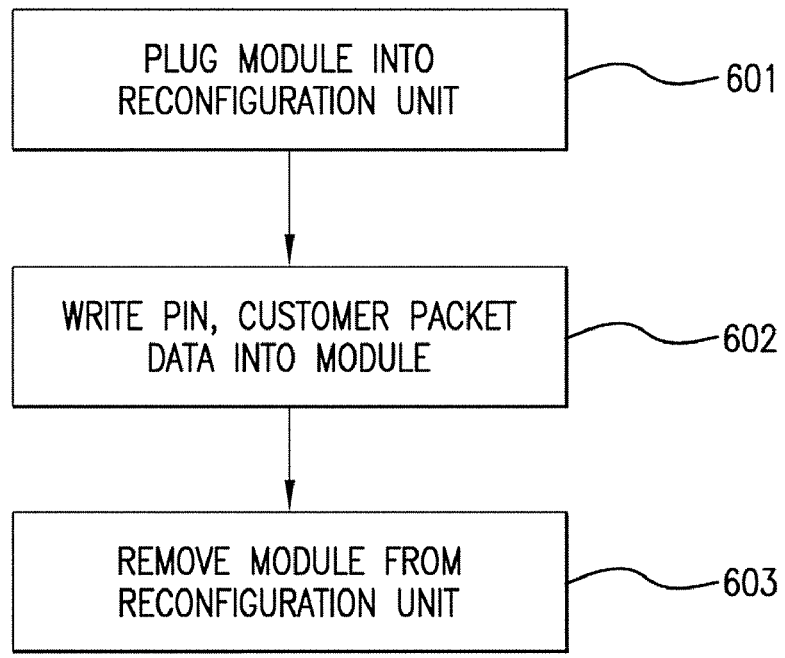
FIG. 6 is a flow chart depicting the initialization or encoding of PIN and packet data in the module during manufacture.

FIG. 6 is a flow chart depicting the initialization or encoding of the module during manufacture; in particular, at step 601, the module is plugged into a test or initialization unit, powered, and at step 602 the PIN or cryptographic key 304 is generated and written into the unit, after which the module is removed from the programming setup unit at step 603. In addition to including information on this customer or class of customer equipment for which the module is authorized to be operative with, the key may cryptographically encrypt the serial number or other manufacturer's data, such as a digital signature or watermark.

Figure 7:
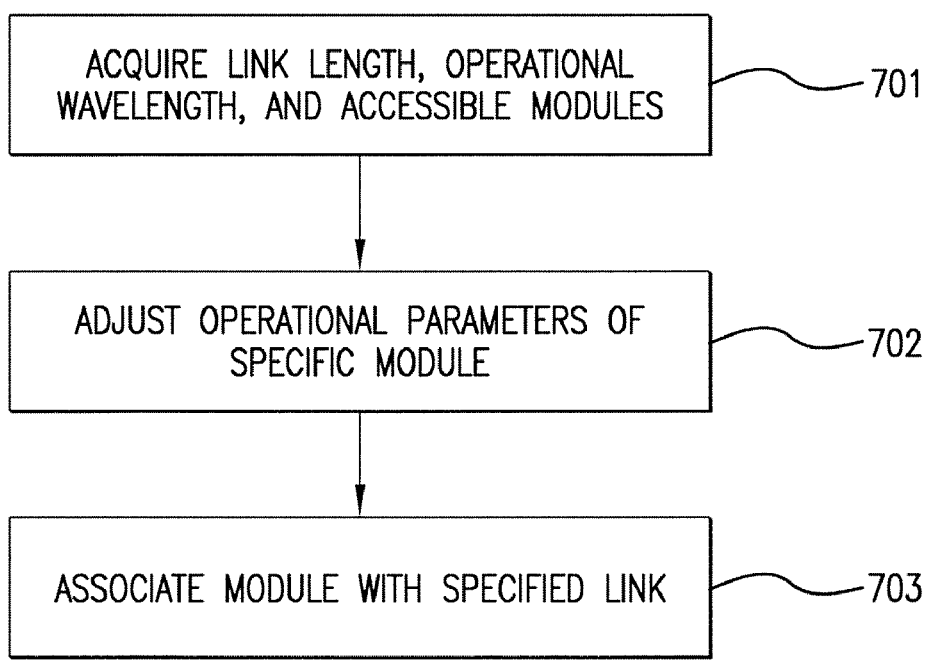
FIG. 7 is a flow chart depicting setting the operational parameters of a module using a portable terminal.

FIG. 7 is a flow chart depicting the adjustment of the operational parameters of a module after it is plugged into a host unit. The unit is plugged in at step 701, powered by the host unit and the serial number, PIN, and/or customer code read from the module and processed by the host system. A processor 258 may be provided in the host unit which performs this function, or in larger networks the host unit may transfer the acquired data to a remote authentication server 406 or processor performing the authentication function.

As set forth in the flow chart of FIG. 7, at step 701, link data (such as link length, wavelength, modulation technique, etc.) is acquired in the module from the host unit. At step 702, the acquired data is used in the module to set the laser power, wavelength, and other operational parameters. Step 703 illustrates one of a variety of possible operations by the network manager on the acquired data in this embodiment; the selected module is associated with the designated link, and the data traffic from the host unit is converted into an optical signal in the selected module and transferred over the attached optical fiber cable.

Figure 8:
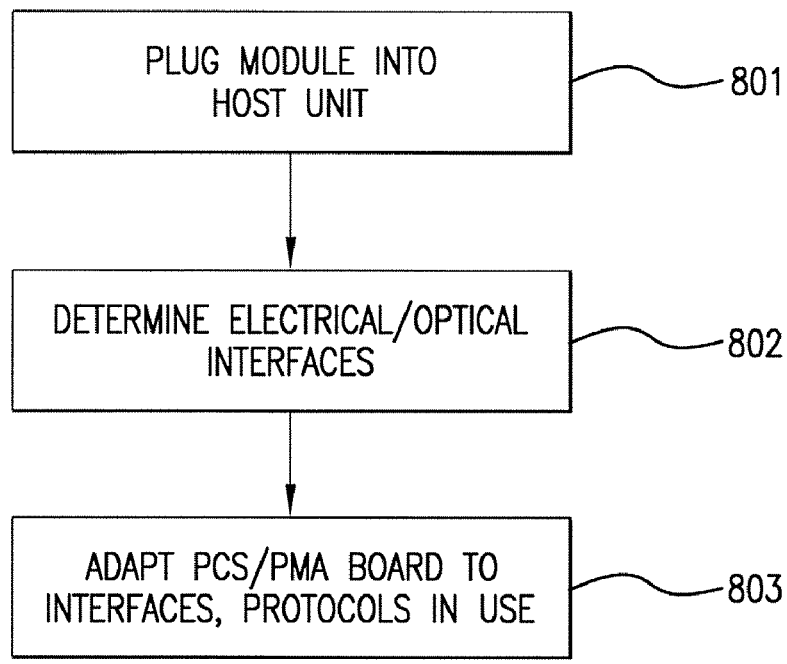
FIG. 8 is a flow chart depicting the determination of the electrical and/or optical interfaces.

Another feature of the invention is set forth in the flow chart of FIG. 8, which describes another aspect of the present invention. At step 801, the module is plugged into the host unit. Electrical signals are sent over the connector, processed internally in the module, and at step 802, a determination made of the protocol and/or packet format in use. The electrical parameters of the module is then adapted to the electrical protocol and packet format, at step 803. The optical fiber is then plugged in, the optical signals processed, and a determination made of the protocol and/or packet format in use. The optical parameters and optical packet is then adapted to the desired format.

Figure 9:
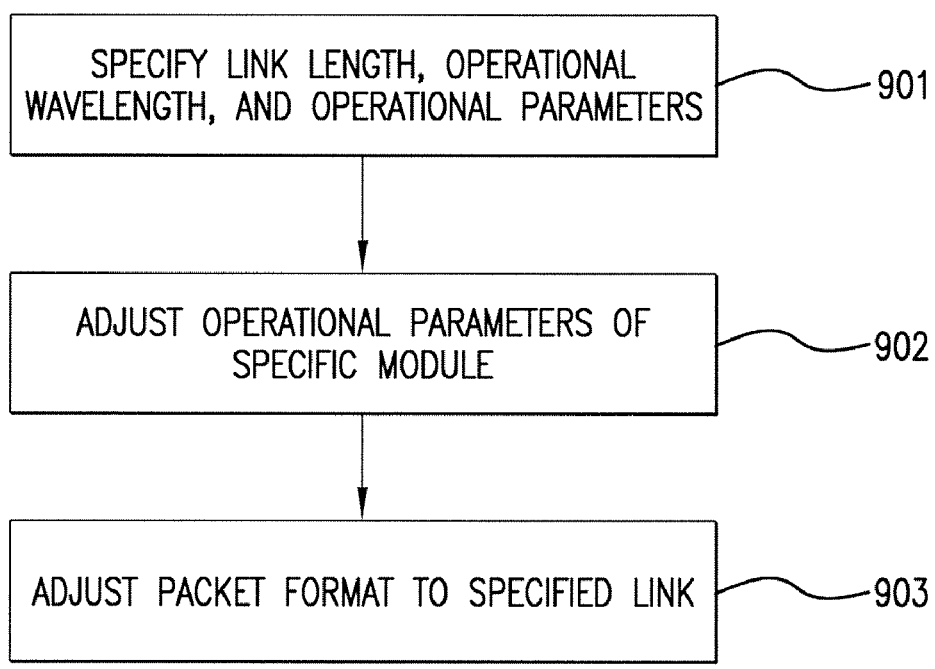
FIG. 9 is a flow chart depicting the adjustment of a module's operational parameters and packet format in response to user or network management specifications.

Another feature of the invention is set forth in the flow chart of FIG. 9, which describes another aspect of the present invention. At step 901, operational parameters (such as link length, wavelength, modulation technique, quality of service, etc.) is specified by the user and acquired by the module. At step 902, the acquired data is used in the module to set the laser power and other operational parameters (such as wavelength, amount of jitter or chirp, protocol, data in control fields of packets, data rate, packet size, error correction technique such as forward error correction, or optical modulation technique). At step 903, the packet is formatted according to format used in the host network as specified by the network manager. Step 903 illustrates one of a variety of possible adjustments by the network manager on the acquired data in this embodiment; as noted above, performance data is periodically sampled and compared against predetermined operational criteria. Such criteria may be used to determine if the module is operating within normal environmental and operational parameters, or being subject to occasional stress which may affect reliability or lifetime.

Various aspects of the techniques and apparatus of the present invention may be implemented in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

The invention claimed is:

1. A reconfigurable optoelectronic module for coupling an information system device with an optical fiber comprising:
   a housing including an electrical connector for coupling with an external electrical cable or information system device and for transmitting information-containing electrical signals over said electrical connector, and a fiber optical connector adapted for coupling with an external optic fiber for transmitting an optical signal;
   an electro-optic subassembly disposed in said housing coupled to the information system device for converting the electrical signals to modulated optical signals corresponding to the electrical signals at a predetermined wavelength; and
   a controller disposed in said housing for providing an electrical control signal to said electro-optic subassembly for adjusting one or more communications transmission characteristics of the modulated optical signal, wherein one of the adjusted communications transmission characteristics includes an error correction methodology.

2. The module of claim 1, wherein another of the adjusted communications transmission characteristics includes an output power of a laser.

3. The module of claim 1, wherein another of the adjusted communications transmission characteristics includes a wavelength of an optical beam emitted by a laser.

4. The module of claim 1, wherein another of the adjusted communications transmission characteristics includes jitter or chirp associated with an optical beam emitted by a laser.

5. The module of claim 1, wherein another of the adjusted communications transmission characteristics includes a communications protocol.

6. The module of claim 1, wherein another of the adjusted communications transmission characteristics includes data in a control field of a packet being transmitted.

7. The module of claim 1, wherein another of the adjusted communications transmission characteristics includes a data rate.

8. The module of claim 1, wherein another of the adjusted communications transmission characteristics includes a packet size of a packet being transmitted.

9. The module of claim 1, wherein the error correction methodology is forward error correction.

10. The module of claim 1, wherein another of the adjusted communications transmission characteristics includes an optical modulation technique.

11. A reconfigurable optoelectronic module for coupling an information system device with an optical fiber comprising:
    a housing including an electrical connector for coupling with an external electrical cable or information system device and for transmitting information-containing electrical signals over said electrical connector, and a fiber optical connector adapted for coupling with an external optic fiber for transmitting an optical signal;
    an electro-optic subassembly disposed in said housing coupled to the information system device for converting the electrical signals to modulated optical signals corresponding to the electrical signals at a predetermined wavelength; and
    a controller disposed in said housing for providing an electrical control signal to said electro-optic subassembly for adjusting a packet size of a packet being transmitted, and for adjusting an optical modulation technique.

12. The module of claim 11, wherein the controller is further configured to adjust jitter or chirp associated with an optical beam emitted by a laser.

13. The module of claim 11, wherein the controller is further configured to adjust a communications protocol.

14. The module of claim 11, wherein the controller is further configured to adjust a control field of a packet being transmitted.

15. The module of claim 11, wherein the controller is further configured to adjust a data rate.

16. The module of claim 11 wherein the controller is further configured to adjust an error correction methodology.

17. The module of claim 16, wherein the error correction methodology is forward error correction.

18. A reconfigurable optoelectronic module for coupling an information system device with an optical fiber comprising:
    a housing including an electrical connector for coupling with an external electrical cable or information system device and for transmitting information-containing electrical signals over said electrical connector, and a fiber optical connector adapted for coupling with an external optic fiber for transmitting an optical signal;
    an electro-optic subassembly disposed in said housing coupled to the information system device for converting the electrical signals to modulated optical signals corresponding to the electrical signals at a predetermined wavelength;
    a wireless transceiver disposed in said housing to receive control instructions from a remote device via a wireless interface; and
    a controller disposed in said housing and coupled to said wireless transceiver, said controller for providing an electrical control signal to said electro-optic subassembly for adjusting at least one of a packet size of a packet being transmitted and an error correction methodology responsive to the received control instructions.

19. The module of claim 18, wherein the error correction methodology is forward error correction.

* * * * *